United States Patent
Diamante

(10) Patent No.: US 11,636,441 B2
(45) Date of Patent: Apr. 25, 2023

(54) SYSTEMS AND METHODS FOR IMPROVED QUALITY ASSURANCE

(71) Applicant: T-Mobile USA, Inc., Bellevue, WA (US)

(72) Inventor: Mark Anthony Diamante, Chino, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 111 days.

(21) Appl. No.: 17/367,076

(22) Filed: Jul. 2, 2021

(65) Prior Publication Data

US 2022/0004997 A1 Jan. 6, 2022

Related U.S. Application Data

(60) Provisional application No. 63/047,656, filed on Jul. 2, 2020.

(51) Int. Cl.
| | |
|---|---|
| *H04W 24/00* | (2009.01) |
| *G06Q 10/1093* | (2023.01) |
| *H04W 16/22* | (2009.01) |
| *H04W 16/18* | (2009.01) |
| *H04W 24/10* | (2009.01) |
| *H04W 64/00* | (2009.01) |

(52) U.S. Cl.
CPC ........ *G06Q 10/1093* (2013.01); *H04W 16/18* (2013.01); *H04W 16/22* (2013.01); *H04W 24/10* (2013.01); *H04W 64/00* (2013.01); *H04W 64/006* (2013.01)

(58) Field of Classification Search
CPC .. G06Q 10/1093; H04W 16/18; H04W 16/22; H04W 24/10; H04W 64/00; H04W 64/006
See application file for complete search history.

(56) References Cited

U.S. PATENT DOCUMENTS 11,082,862 B1 * 8/2021 Thakur .................. H04W 16/18
2020/0228631 A1 * 7/2020 Ward ....................... H04L 67/12

* cited by examiner

*Primary Examiner* — Justin Y Lee
(74) *Attorney, Agent, or Firm* — Loeb & Loeb LLP

(57) ABSTRACT

A method for quality assurance management of cellular site comprising receiving a user selection of a selected cellular site of a plurality of cellular sites. Based on the user selection of the selected cellular site, the method include retrieving site parameters and selectively displaying the site parameters via a GUI. The method includes receiving photographs of the selected cellular site, the photographs captured by the user computing device. The method includes transmitting the photographs to the site database. The method includes providing site data fields for receiving cellular site data via the GUI, and receiving, via the one or more site data fields, user entries of cellular site data associated with the selected cellular site. The method includes transmitting the user entries of cellular site data to the site database.

20 Claims, 13 Drawing Sheets

| QA SCHEDULE | Sun | Mon | Tue | Wed | Thu | Fri | Sat |
|---|---|---|---|---|---|---|---|
| Date: July 15<br>Site 7<br>Region: A<br>Vendor: Co. A<br>Engineer: John D.<br>GC: Co. B | | | | | 1<br>Site 1<br>Site 2 | 2<br>Site 3<br>Site 4 | 3 |
| | 4 | 5 | 6 | 7 | 8 | 9 | 10 |
| Date: July 15<br>Site 8<br>Region: A<br>Vendor: Co. C<br>Engineer: Jane D.<br>GC: Co. D | 11 | 12 | 13<br>Site 5<br>Site 6 | 14 | 15<br>Site 7<br>Site 8 | 16 | 17 |
| | 18 | 19 | 20 | 21 | 22 | 23 | 24 |
| | 25 | 26 | 27 | 28 | 29 | 30 | |

FIG. 8B

SUBMIT NEW ISSUE

* DATE VISITED
  [DATE]

* MARKET
  Select Market

* PROJECT
  Select a project

* CLUSTER
  Pick a cluster

SITEID

SECTOR
  0

* POSITION
  0

* ISSUE CATEGORY
  Pick a category

ISSUE
  Pick an issue

* CM VENDOR
  Pick an option

General Contractor
  Pick an option

RESOLUTION STATUS
  Pick an option

* ENGINEER
  Pick an option

COMMENTS

FIG. 8D

DATABASE INFO

SITE ID
[ENTER SITE ID]

SITE ACCESS DETAILS

SITE ID
[ENTER SITE ID]

AZIMUTH

ANTENNA TYPE

MECHANICAL TILT

SITE ID
[ENTER SITE ID]

FIELD OPERATIONS

CELL NAME
[ENTER CELL NAME]

PCI

FIG. 8G

SYSTEMS AND METHODS FOR IMPROVED QUALITY ASSURANCE

CROSS-REFERENCE TO RELATED APPLICATIONS

This application claims priority to U.S. Provisional Application No. 63/047,656, filed Jul. 2, 2020, the disclosure of which is incorporated by reference herein in its entirety.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Organizations that may operate or maintain various sites or installations, such as cellular antenna sites, power facilities, maintenance facilities, etc., may periodically conduct quality assurance operations relating to those sites or installations. For example, engineers or other agents working with cellular network operators may inspect, adjust, repair, or otherwise tend to cell cites housing cellular antennas and associated equipment. The coordination, management, documentation, reporting, etc., related to such site visits can be time and resource intensive.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, the disclosure describes a computer-implemented method for quality assurance management of cellular sites. The method may include receiving, via a graphical user interface (GUI), a user selection of a selected cellular site of a plurality of cellular sites. Based on the user selection of the selected cellular site, the method may include retrieving, from a site database, one or more site parameters associated with the selected cellular site and selectively displaying, on a user computing device, the one or more site parameters for the selected cellular site via the GUI. The method may include receiving, via the GUI, one or more photographs of the selected cellular site. The one or more photographs may be captured by the user computing device. The method may include transmitting the one or more photographs to the site database The method may include providing, via the GUI, one or more site data fields for receiving cellular site data and receiving, via the one or more site data fields, one or more user entries of cellular site data associated with the selected cellular site. The method may include transmitting the one or more user entries of cellular site data to the site database.

In another embodiment, the disclosure describes a system for quality assurance management of cellular sites. The system may include a user computing device connected to a digital communications network. The user computing device may include one or more processors programmed to operate a graphical user interface (GUI) of a quality assurance (QA) application and a camera. The system may include a site database accessible via the digital communications network. The site database may be configured to store cellular site data for a plurality of cellular sites. The system may include a quality assurance (QA) server connected to the digital communications network. The QA server may include one or more processors programmed to receive, from the user computing device, a user selection of a selected cellular site of the plurality of cellular sites, the user selection being made via the GUI. The one or more processors may be programmed to determine one or more selected site parameters of a plurality of site parameters associated with the selected cellular site and to transmit the one or more selected site parameters to the user computing device via the GUI. The one or more processors may be programmed to receive one or more photographs of the selected cellular site from the user computing device, the photographs having been captured with the camera on the user computing device. The one or more processors may be programmed to receive one or more user entries of cellular site data from the user computing device, the one or more user entries of cellular site data being associated with the selected cellular site. The one or more processors may be programmed to determine whether the one or more user entries of cellular site data include a predetermined set of requested cellular site data associated with the selected cellular site. The one or more processors may be programmed to transmit the one or more photographs and the one or more user entries of cellular site data to the site database when the QA server determines that the one or more user entries of cellular site data includes the predetermined set of requested cellular site data associated with the selected cellular site.

In another embodiment, the disclosure describes a system for quality assurance management. The system may include means for receiving a user selection of a selected cellular site of a plurality of cellular sites and means for retrieving, from a site database, one or more site parameters associated with the selected cellular site based on the user selection of the selected cellular site. The system may include means for determining one or more selected site parameters of a plurality of site parameters associated with the selected cellular site. The system may include means for transmitting the one or more selected site parameters to a user computing device. The system may include means for displaying the one or more selected site parameters for the selected cellular site on the user computing device. The system may include means for receiving one or more photographs of the selected cellular site, the one or more photographs being captured by the user computing device. The system may include means for receiving one or more user entries of cellular site data from the user computing device, the one or more user entries of cellular site data being associated with the selected cellular site. The system may include means for determining whether the one or more user entries of cellular site data include a predetermined set of requested cellular site data associated with the selected cellular site. The system may include means for transmitting the one or more photographs and the one or more user entries of cellular site data to the site database when the one or more user entries of cellular site data includes the predetermined set of requested cellular site data associated with the selected cellular site.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 8B is another screen shot of an embodiment of a graphical user interface for an embodiment of the quality assurance management system described herein;

FIG. 8D is another screen shot of an embodiment of a graphical user interface for an embodiment of the quality assurance management system described herein;

FIG. 8G is another screen shot of an embodiment of a graphical user interface for an embodiment of the quality assurance management system described herein.

Figure 1:
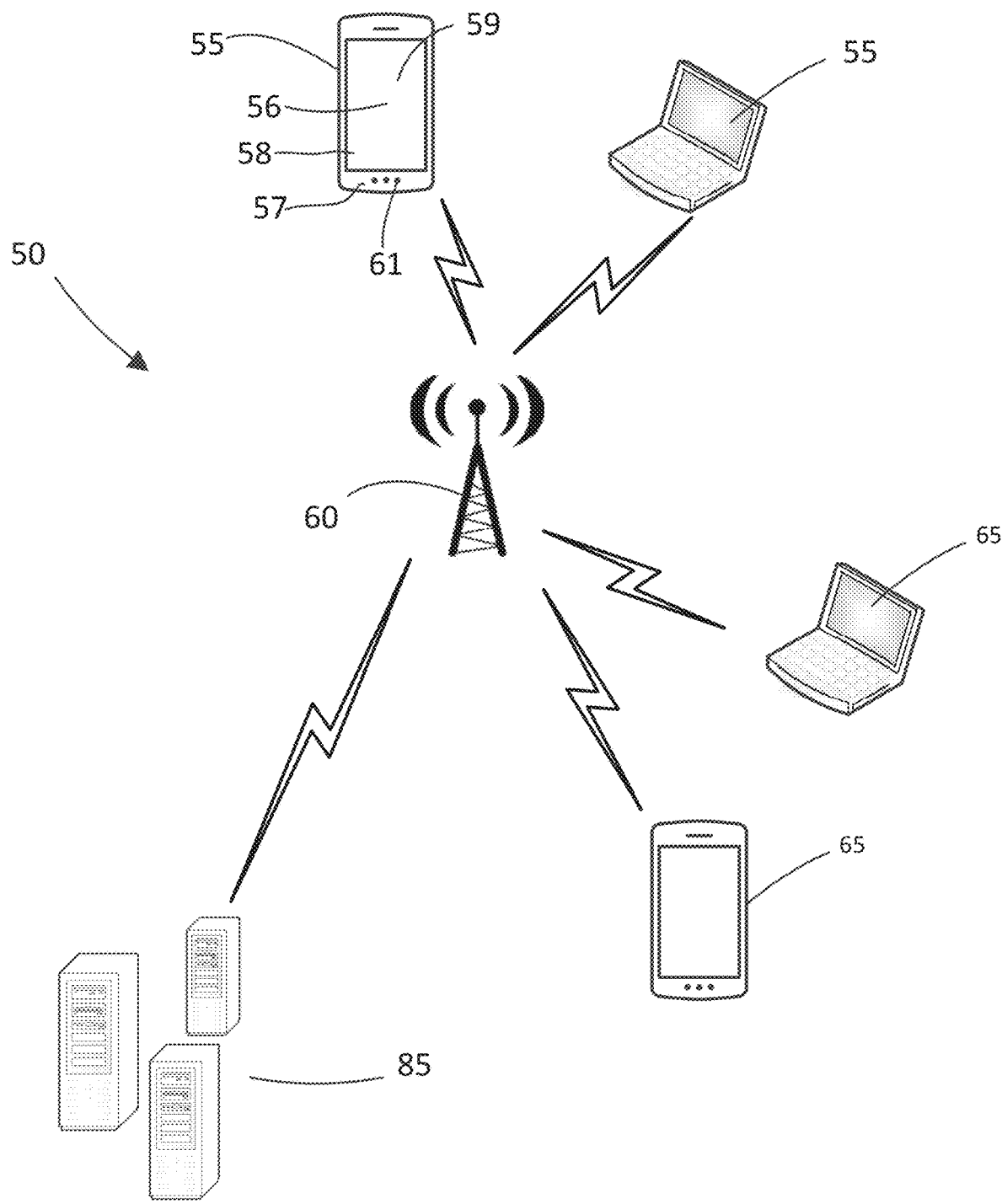
FIG. 1 is an illustration of the elements of an embodiment of a computer system that includes a system for improved quality assurance as disclosed herein.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Organizations that maintain numerous facilities may need to conduct periodic maintenance and quality assurance (QA) activities. For example, a cellular network operator may manage and maintain a large number of facilities, many of which may be cellular sites that include cellular antennas and associated equipment. Traditionally, coordinating the maintenance of those sites may include managers assigning engineers to visit each site on certain days either periodically on a set schedule or due to upgrades or other modernization efforts at particular sites. Engineers would then visit the sites on the allotted date, bringing along whatever information related to the site that was necessary to complete quality assurance or maintenance work. These materials would have to be gathered ahead of time, based on a detailed review of the type of site, the location, the equipment present, etc., as this type of information may generally not have been available once on-site. Upon visiting the site, the QA engineers or other agent may take notes on the state of the site, take photos for documentation, and otherwise record any work completed or other notable subject matter. The engineer or agent would then need to bring the documentation back to an office location, where the notes or other documentation may be transferred to a central system or database and otherwise reported to a responsible manager. Often, an engineer may have multiple site visits and may be unable to quickly and efficiently return to an office location to transfer documentation or other notes. As a result, documentation of QA activities may be delayed, entered incorrectly, or lost completely. Additionally, because access to the data repository may be only available from certain central locations, the time taken to travel and manually update a central database with the current documentation may result in fewer sites visited, slow site troubleshooting, and an overall lower quality and less effective cellular network.

The system and methods for improved quality assurance described herein may provide user with an improved way to schedule, coordinate, manage, report, document, and monitor quality assurance (QA) activities throughout various work sites. In some embodiments, the system and methods described herein may include a QA management application that may include various graphical user interfaces (GUIs), portals, and other features that may help an organization efficiently manage its QA operations. Using the QA management application, in some embodiments, managers may schedule and assign site visits to engineers or other agents. The QA management application may also allow engineers to log notes, enter information, upload documentation, or log other data directly to a central database and associated with the site visited. The QA management application may provide directions to the cellular site, may provide access to a database of site parameters (e.g., radio frequency (RF) parameters), may provide reports to responsible managers or other personnel, and may provide site-specific information regarding the QA requirements or other considerations.

Thus, the system and methods described herein may provide a technical solution to various technical problems associated with quality assurance. Specifically, the QA management system and application may solve the technical problem of providing widespread access to site-specific information used to conduct QA activities. The QA management system may also provide a technical solution to the technical problem of efficiently and remotely receiving site QA documentation and storing that information in the proper location accessible to others in a central database associated with the particular site. Providing more efficient QA management with the QA management system described herein may provide for faster QA activities, decreasing time to address and troubleshoot potential problems at cellular sites, and as a result, improve network quality, efficiency, and reliability.

Additionally, the systems and methods describe herein may provide computer devices, such as smart phones or tablets, with technical capabilities or improvements that were not previously available. For example, the QA management system described herein may allow a technician's mobile device to report or upload QA site data or documentation directly to a central database, thus eliminating the need for a technician perform various additional steps to report or update QA site parameters. Thus, the QA management system described herein does more than merely link the system to a technical field—instead, the system improves the technology so as to provide capabilities not previously available. Such capabilities improve the technical field of site quality assurance, and more particularly, the technical field of electronically reporting QA site activities so as to reflect updated site parameters at a central database in substantially real time. Further, the QA management system described herein may improve upon previous methods and devices used in this field by providing coordinating, collecting, and reporting QA site visit data and documentation in a way that was previously not possible with traditional systems.

In some embodiments, the QA management system may include various features and modules, including a scheduling module, a navigation module, a parameter database module, a documentation module, a reporting module, and other modules providing additional features. In some embodiments, the scheduling module may provide a calendar of QA activities that may vary based on which network operator agent accesses the QA management application. For example, a manager may enter identifying information to access the scheduling module via the QA management application and may have access to a QA site visit calendar for the QA sites within that manager's (and/or other manager's) responsibility. In some embodiments, the QA management application may allow a particular user to use the scheduling module to add QA activities on particular days or with particular deadlines, assign a particular engineer or agent to the specific QA activity, etc. In some embodiments, the engineer assigned to the QA activity may receive an alert indicating that a QA activity, such as a QA site visit, has been assigned, and the QA management application may add the QA activity to a calendar accessible to the assigned engineer.

In some embodiments, the navigation module may provide access to site location directions, either directly or through a third party application or website. For example, an engineer may login to access the QA management application and access a scheduling module, as described above. The engineer may select a scheduled QA activity from the calendar to access a record for a QA activity. The QA site record may provide the QA site address in the QA management application. In some embodiments, the engineer may simply select the site address and the QA application may provide the map location of the site and/or navigation instructions to guide the engineer to the QA site. Thus, the navigation module may relieve the engineer of any need to note the QA site address prior to leaving a central office or other location with central access to site locations, and may merely access the location via a mobile device loaded with the QA management application.

In some embodiments, the parameter database module may provide access to QA site parameters that an engineer or other agent may need access to during a QA site visit in order to complete the QA activity. For example, the QA management application may include radio frequency (RF) parameters associated with the particular QA site. In some embodiments, the RF parameters may be stored directly on the engineer's mobile device, or may be stored remotely in a central parameter database and accessible via the QA management application. The QA site parameters may include various information particular to the QA site, such as azimuth for one or more antennas at a cellular site, physical channel identity (PCI) associated with a cellular site, antenna layout, tilt, and/or any other QA site parameters that may be useful to an engineer or other agent conducting QA activities. In some embodiments, any changes made in the central parameter database may be reflected in the parameter database module in substantially real time so that engineers conducting QA site visits may have access to the most accurate information. In some embodiments, RF parameters may reside in RF data sheets (RFDS), operational support systems (OSS), element management system (EMS), etc.

In some embodiments, the documentation module may provide the engineer or agent performing QA site activity with a platform to upload photographs, notes, or other documentation associated with the QA site directly to the QA site record using the QA management application on the engineer's mobile device. For example, during QA activity, an engineer may collect photographs of the QA site related to the QA activity using a mobile device (e.g., smartphone, digital camera, etc.). In some embodiments, the photographs or other documentation uploaded via the QA management application may be automatically stored to a database and associated with the QA site or QA site record. In some embodiments, the QA management application may provide filename writing capabilities to name the photograph or other files as appropriate. The QA site photographs or other documentation may then be accessible at substantially any time via the QA management application.

In some embodiments, the reporting module may enable a user to update information pertaining to a QA site (e.g., RF parameters, etc.) via the QA application from the user's computing device (e.g., smartphone running the QA application). In some embodiments, any changes made to the QA site's parameters in the QA application may be reflected in the central parameter database and accessible by any other user accessing the QA site's dashboard or information. For example, an engineer performing QA activities at a site may update site parameters via the QA application on the engineer's mobile device based on observation or modifications made at a cellular site, and a manager or project leader may access the updated information via the QA application on the manager's computing device. In some embodiments, the QA applications may provide an option to print a report relating to QA site activities, such as in PDF format or other suitable format. The report may be stored in the central database associated with the QA site or be shared by other means.

FIG. 1 shows a high level illustration of some of the elements in a sample computing and network system 50 that may be physically configured to implement the systems and methods for improved quality assurance. The system 50 may include one or more user computing devices 55, such as smartphones or tablet computers, mobile computing devices, wearable mobile devices, desktop computers, laptop computers, or any other computing devices that allow users to interface with a digital communications network, such as digital communication network 60. Connection to the digital communication network 60 may be wired or wireless, and may be via the internet or via a cellular network or any other suitable connection service. In some embodiments, the user computing devices 55 may include mobile devices of engineers or other network operator agents that may be tasked with performing QA activities using the QA system described herein. One or more supervisor computing devices 65 may also be included in the system 50 and may connect to network 60. Similar to the user computing devices 55, the supervisor computing devices 65 may be smartphones or tablet computers, mobile computing devices, wearable mobile devices, desktop computers, laptop computers, or any other computing devices that allow users to interface with a digital communications network. In some embodiments, the user computing devices 55 and/or the supervisor computing devices 65 may be specifically physically configured to optimally run the QA application described herein.

One or more computer servers may also be connected via the digital communication network 60, such as QA server 85. It is contemplated that the QA server 85 may be connected to the one or more user computing devices 55 and one or more supervisor computing devices 65 over the digital communication network 60. In some embodiments, the QA server may include a central QA site database where site parameters for various cellular sites or other equipment installations may be stored. For example, in some embodiments, the QA site database may include a site entry for each cellular site that may include parameters and other information related to the particular site. In some embodiments, the site parameters may reside in RF data sheets (RFDS) particular to each cellular site, operational support systems (OSS), element management system (EMS), etc. In some embodiments, the QA server 85 may host the QA application and be accessible remotely from the user computing devices 55 and supervisor computing devices 65. In some embodiments, each of the user computing devices 55 and the supervisor computing devices 65 may run a version of the QA application locally and access data directly from the QA server 85 and related databases. In some embodiments, the QA server 85 may be multiple servers stored in one or multiple locations, each of which may host portions of the QA site database or redundant copies of the QA site database that may be updated between one another periodically.

In one embodiment, the computing device 55 may be a device that operates using a portable power source, such as a battery. The computing device 55 may also have a display 56 which may or may not be a touch sensitive display. More specifically, the display 56 may have a capacitance sensor, for example, that may be used to provide input data to the computing device 55. In other embodiments, an input pad 57 such as arrows, scroll wheels, keyboards, etc., may be used to provide inputs to the computing device 55. In addition, the computing device 55 may have a microphone 58 which may accept and store verbal data, a camera 59 to accept images and a speaker 61 to communicate sounds. In some embodiments, the supervisor computing device 65 may include the same or similar features as those described with reference to the user computing device.

Figure 2:
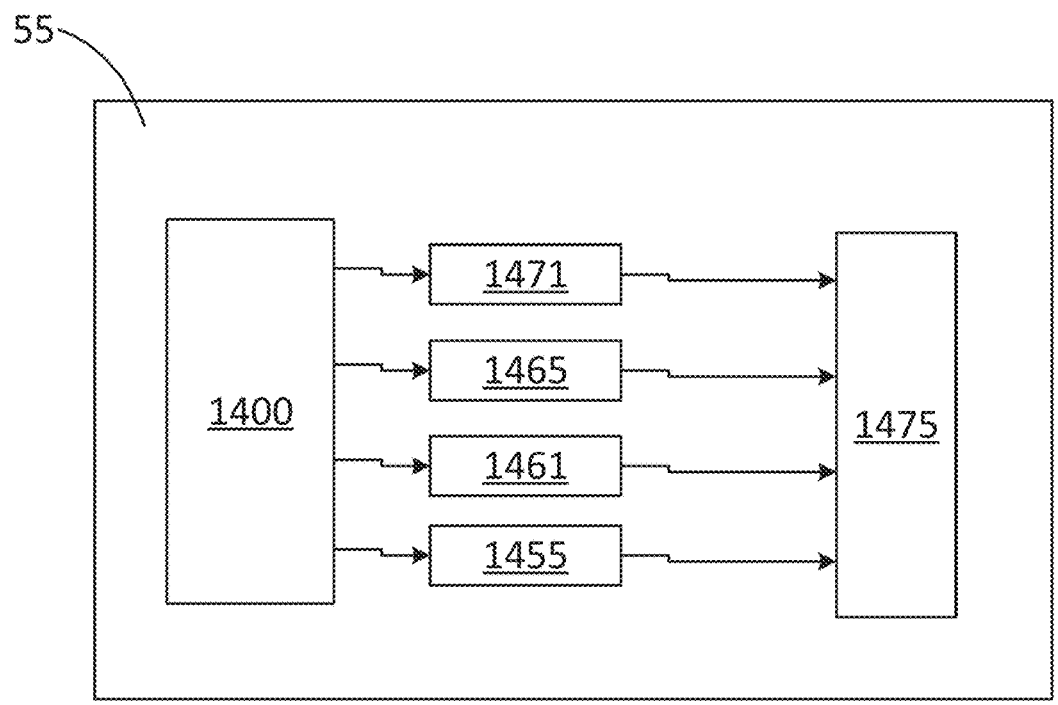
FIG. 2 is a schematic illustration of elements of an embodiment of an example computing device.
Figure 3:
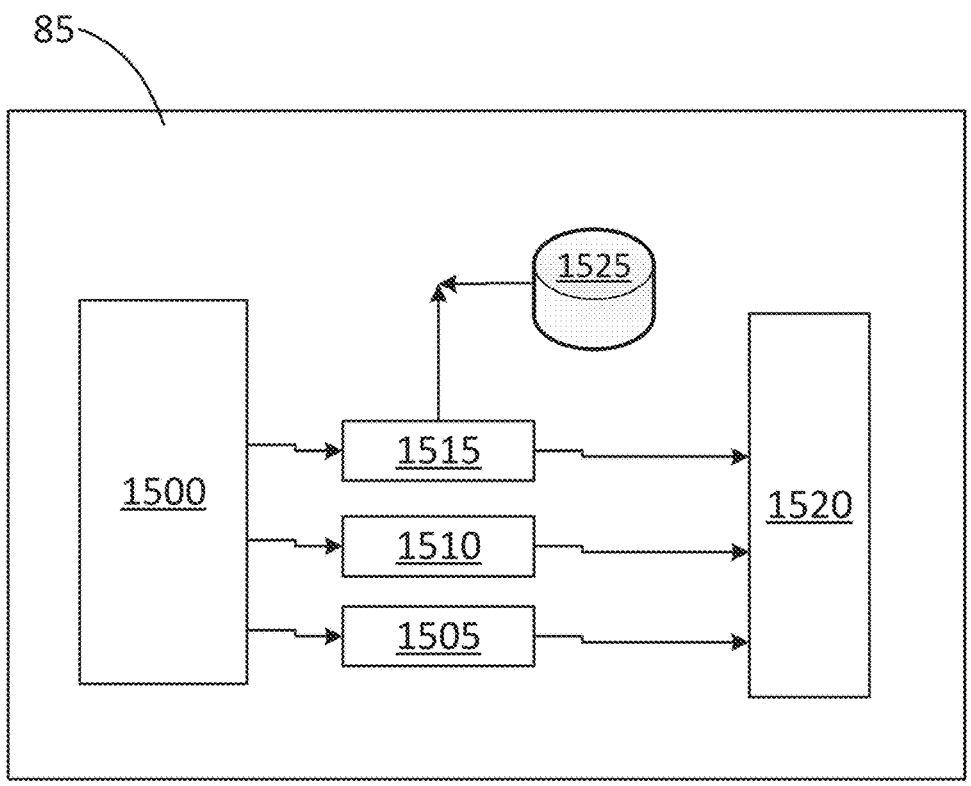
FIG. 3 is a schematic illustration of elements of an embodiment of a server-type computing device.

FIG. 2 is a simplified illustration of the physical elements that make up an embodiment of a computing device 55 and FIG. 3 is a simplified illustration of the physical elements that make up an embodiment of a server type computing device, such as the QA server 85. Referring to FIG. 2, a sample computing device 55 is illustrated that is physically configured according to be part of the computing system 50 shown in FIG. 1. The user computing device 55 may have a processor 1451 that is physically configured according to computer executable instructions. In some embodiments, the processor can be specially designed or configured to optimize communication between the server 65 and the computing device 55 relating to the electronic business notification system described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera 59, a display 56, or other input/output devices. The user computing device 55 also may control communicating with the networks, such as communications network 60 in FIG. 1, either through wireless or wired devices. Of course, this is just one embodiment of the user computing device 55 and the number and types of user computing devices 55 is limited only by the imagination.

The physical elements that make up an embodiment of a server, such as the QA server 85, are further illustrated in FIG. 3. In some embodiments, the QA server 85 is specially configured to run the QA application, database, and other elements related to the QA system as described herein. At a high level, the QA server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between a user computing device, such as computing device 55, and the server 85 relating to the QA system as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communications network 60, either through wireless or wired devices. In some embodiments, QA controller for running the QA system through an the QA application may be located on the user computing device 55. However, in other embodiments, the QA controller may be located on QA server 85, or both the computing device 55 and the server 85. Of course, this is just one embodiment of the QA server 85 and additional types of servers are contemplated herein.

Figure 4:
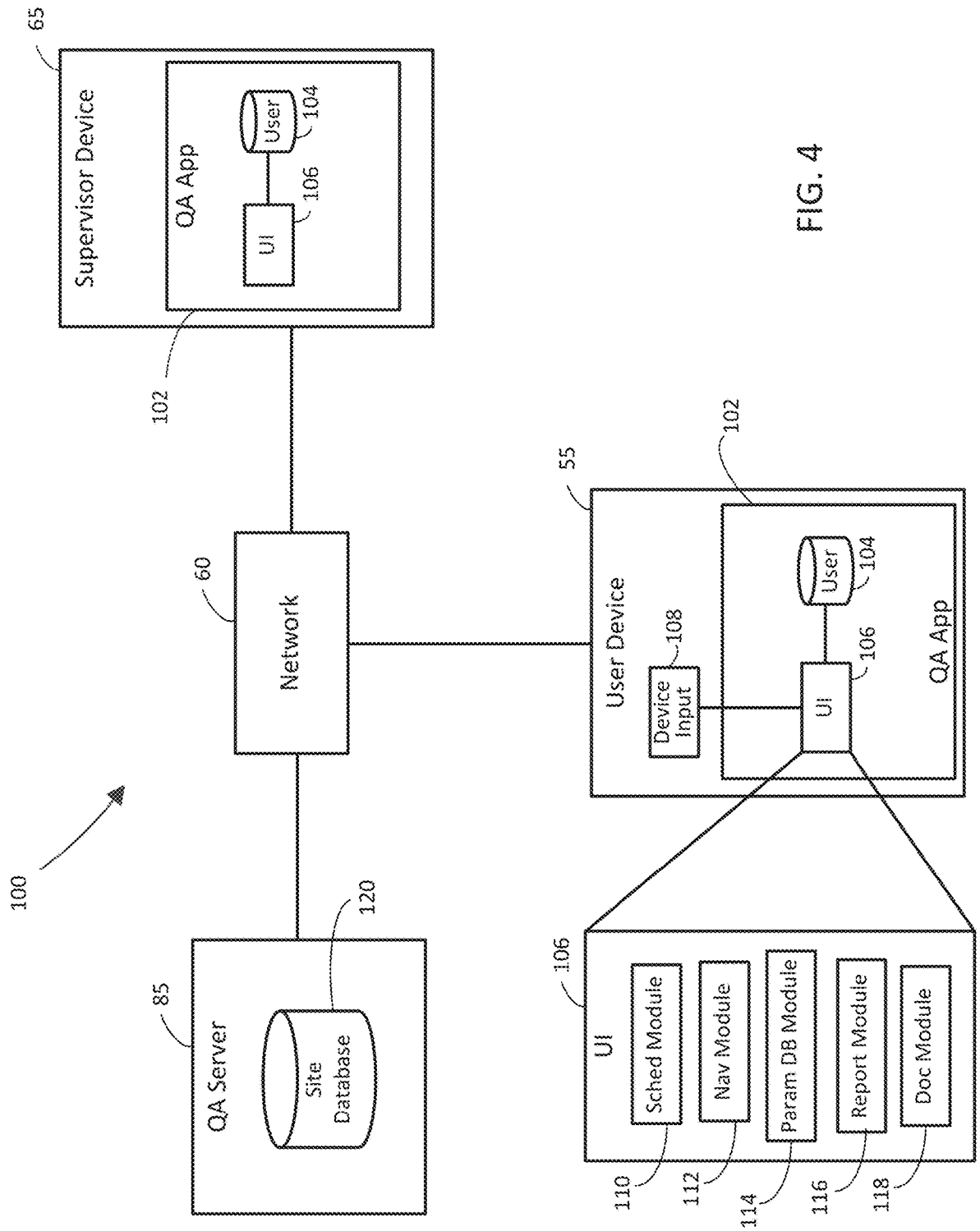
FIG. 4 is a block diagram illustrating system elements for an embodiment of an quality assurance management system in accordance with the current disclosure.

FIG. 4 is a schematic illustration of an embodiment of a QA system 100. The QA system 100 may include one or more user computing devices 55, which may be associated with a user such as a QA engineer or other agent of a network operator or other entity performing quality assurance activities. The QA system 100 may also include one or more supervisor computing devices 65, which may be associated with a user such as a manager or other entity who may schedule, coordinate, and/or otherwise oversee quality assurance activities. The user devices 55 and the supervisor devices 65 may each be connected to a QA server 85 via the digital communications network 60.

Each of the user devices 55 and the supervisor devices 65 may run, either locally or remotely, a QA application 102. In some embodiments, the user devices 55 may run different versions of the QA application 102 than the supervisor devices 65, or may allow different access and permissions to users registered as engineers or other QA agents and supervisors or managers. In some embodiments, each user may log into the QA application and may be granted particular sets of permissions and access based upon the particular user's position or job requirements. In some embodiments, the QA application 102 each user device 55 and supervisor device 65 may include a user profile 104 for the particular user or multiple users who may have logged into the QA application using the particular device. For example, the QA application 102 running on a particular user device 55 may store user profile information 104 for a particular user associated with that device. In some embodiments, a user device 55 or supervisor device 65 may be accessible to multiple users (e.g., a computer in an office) and may therefore store user profile information for any user who has logged into the QA application 102 using that device.

The QA application 102 may include a user interface (UI) 106, which may be a graphical user interface (GUI), through which the user may interact with the QA application. Non-exhaustive and non-restricting examples of embodiments of the UI 106 are included herein. The user device 55 may also have a device input 108, which may be a camera, a keyboard, a microphone, or any other type of sensor or input that may provide information from the user or the environment to the user interface 106. The UI 106 may provide a user access to various modules of the QA application 102. In some embodiments, the UI 106 may include a scheduling module 110, a navigation module 112, a parameter database module 114, a reporting module 116, a documentation module 118, or additional modules that may support QA activities. Those skilled in the art will recognize that, although the supervisor device 65 is not shown to include modules, it should be understood that he UI 106 in the supervisor device may include access to QA modules as well. The supervisor device 65 may also include device inputs as well, in some embodiments. In some embodiments, one or more of the modules accessible through the UI 106 may provide access to data stored remotely in the site database 120 that may be on the QA server 85.

Figure 5:
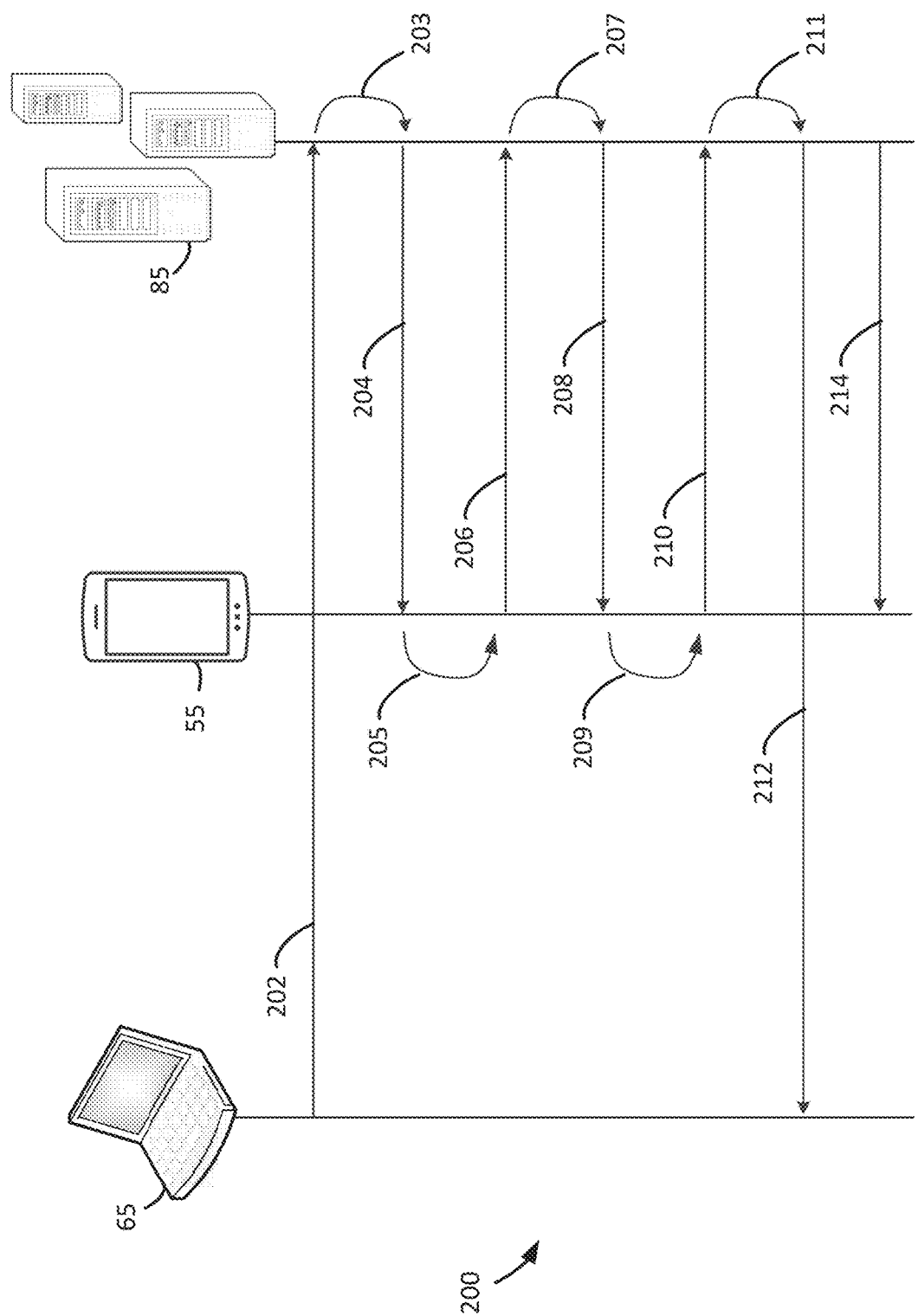
FIG. 5 is a data flow diagram illustrating system elements for an embodiment of the quality assurance management system of FIG. 4.

FIG. 5 is a data flow diagram 200 illustrating the functionality of an embodiment of the QA system 100. In some embodiments, a supervisor, manager, or other authorized user may access the QA application 102 using a supervisor device 65. In some embodiments, the QA application 102 may provide access to information regarding cellular sites or other QA sites that may benefit from quality assurance activities. For example, in embodiments involving cellular network operators, the QA application 102 may provide access to the QA site data on the QA site database 120. In some embodiments, the supervisor may use the QA application UI 106 to access the scheduling module 110 to schedule or coordinate QA site visits. In some embodiments, the scheduling module 110 may include a calendar feature through which a manager may schedule QA site visits. The QA application 102 may be hosted on the QA server, in some embodiments, or on a separate server in some embodiments. In some embodiments, only certain users, like managers or supervisors, may be granted access to scheduling QA site visits on the QA application. At 202, for example, a manager may use the UI 106 on a supervisor device 65 to access the QA application 102 on the QA server 85 to schedule a site visit on a particular day, and may assign a particular engineer or agent to conduct the visit. In some embodiments, when the manager enters the QA site into the calendar using the QA application 102, the scheduling module 110 in the QA application 102 may trigger, at 203, automatically add the scheduled QA site visit to a calendar feature of the particular technician so that the technician may see the scheduled QA site visit in the QA application 102 when logged in through that technician's user device 55. At 204, in response to the QA site visit being added to the technician's calendar, the QA application 102 on the QA server 85 may send a notification to the user device 55 associated with the technician who may be assigned to conduct the QA activity in that site. The notification may be through any of a variety of means, such as Email, a notification on the technician's user device 55, or through any other suitable messaging system (e.g., Microsoft Teams, Slack, etc.). In some embodiments, each engineer or technician may only see or have access to scheduled QA site visits assigned to that particular technician, and not those site visits scheduled for others.

At 205, the technician may receive the notification on the user device 55 or may access the scheduling module 110 to determine what QA site visits may be assigned to the technician on a particular day. In some embodiments, the technician may, at 206, use the UI 106 on the user computing device 55 to access QA site data relevant to the QA site visit scheduled for a particular day. Upon receiving a request to access QA site data, the QA application 102 on the QA server 85 may, at 207, determine what site information may be relevant to provide to the technician for the QA activity scheduled. Additionally, the QA application 102 may, based on the details of the particular QA site, determine which types of information to make available to the technician's user device. For example, the particular QA site may only include certain types of equipment, and the QA site visit may only include inspection or maintenance of a subset of that equipment. The type of equipment to be inspected may be chosen by the responsible manager, or may be a function of periodic review specific to certain equipment, or equipment that may have been recently updated or installed. In such scenarios, the QA application may determine, at 207, that information relating to only the subset of equipment to be inspected is relevant to the technician scheduled to complete the QA activity, and may only provide access to that subset of information. In some embodiments, this determination may vary depending on the user accessing the site database. For example, a manager or supervisor accessing the QA site data for scheduling or review purposes may be allowed to access all the QA site data, while the technician may only be allowed to access the information on a "need to know" basis as determined by the QA server and/or the supervisor. This limited access to information to the technician may provide a technical solution to the technical problem of determining which QA site data to make available to a technician. Providing unfiltered access to QA site information may become inefficient as the technician may then be forced to wade through large amounts of irrelevant information to perform QA tasks. Thus, the QA application 102 may improve QA visit efficiency and allow QA technicians to complete more tasks with fewer errors. At 208, the QA server 85, via the QA application 102, may provide access to QA site data to the user device 55 associated with the responsible technician.

At 209, the technician may perform tasks that may be required for the QA site visit. In some embodiments, the technician may access the navigation module 112 to locate the QA site to be visited and navigate to that location. In some embodiments, the navigation module 112 may include a built-in navigation system, or may automatically access a third-party navigation application, such as Google Maps, Waze, Apple Maps, etc. In some embodiments, the QA application 102 on the technician may access the parameter database module 114 with the user device 55 to identify parameters related to the particular QA site. In some embodiments, the technician may select from a list of QA sites, or otherwise search among the database. In some embodiments, selecting a QA site from the scheduling module 110 may automatically direct the QA application 102 to the data related to that particular QA site in the site database 120. In some embodiments, the parameter database module 114 may include access to an RF parameter database that may provide RF parameters that technicians may use during a QA site survey. The RF parameters may include information such as antenna azimuth, physical channel identity (PCI), antenna layout, antenna tilt, etc. As described above, the parameter database module 114 of the QA application 102 may provide access directly to information stored on the site database 120 at the QA server. Changes made to the site database 120 may be reflected in the parameter database module 114 substantially immediately or within the time to refresh the database module. In such embodiments, the RF parameters and other site-specific data in the site database may be readily available to a technician via the user device 55.

In some embodiments, the reporting module 116 of the QA application may provide an on-site technician with information that may be used to perform QA activities. For example, some QA activity may include reviewing certain site parameters to confirm or update data values, the presence of certain equipment, instrument readings, etc. The reporting module 116 may provide an interface for the technician to review the specific information that should be addressed or updated for that particular QA site visit. In some embodiments, the QA application may prompt the technician to perform such tasks, and provide other information related to that performance, such has the information needed to complete the QA activity, the type of documentation needed, etc. In some embodiments, the reporting module 116 will provide an interface to receive inputs from the technician using the user device 55, such as updated or confirmed parameter values, etc. In some embodiments, the reporting module 116 may prevent a technician from finishing or exiting a report for a QA site until all the required data has been collected and questions answered pertaining to the QA activity. In some embodiments, the documentation module 118 of the QA application 102 may prompt or otherwise inform the technician that certain documentation of the QA visit be collected. For example, for some QA site visits, the technician may use the device inputs 108 on the user device 55 to collect documentation pertaining to the site visit. The documentation may include photographs of the QA site or portions of the QA site (e.g., antennas, power equipment, etc.), notes made by the technician, etc. The documentation may be created using the user device 55.

Once the report is completed and any documentation collected, the reporting module 116 may, at 210, transmit the reported data to the QA server 85 to update the site database 120 as appropriate for the particular QA site. At 211, the QA server may updated the information on the site database to subsequently reflect the updated parameter data received from the user device 55 via the QA application. In some embodiments, the site database 120 may also include any documentation uploaded from the user device 55 to the QA server 85 related to the QA visit.

In some embodiments, the QA application may determine whether a manager or supervisor (or other designated parties) should receive notifications that the QA visit was completed or was not completed. At 212, the QA server 85 may transmit a notification to one or more supervisor devices 65 to notify the associated user that the QA visit and associated reporting has been completed. In some embodiments, the QA application 102 may determine that a complete QA site visit report was not received by the appropriate technician on a date or time in which the QA site visit was scheduled to take place. In such embodiments, the QA application 102 on the QA server 85 may send a notification to the supervisor device 65 alerting the associated user that the QA visit was not completed at the designated date or time. In some embodiments, the QA application 102 may also or alternatively transmit, at 214, a notification to the user device 55 of the technician that may have been assigned to complete the particular QA visit. As described above, the notification may occur via email, text message, device notification, or other messaging service such as Microsoft Teams.

Figure 6:
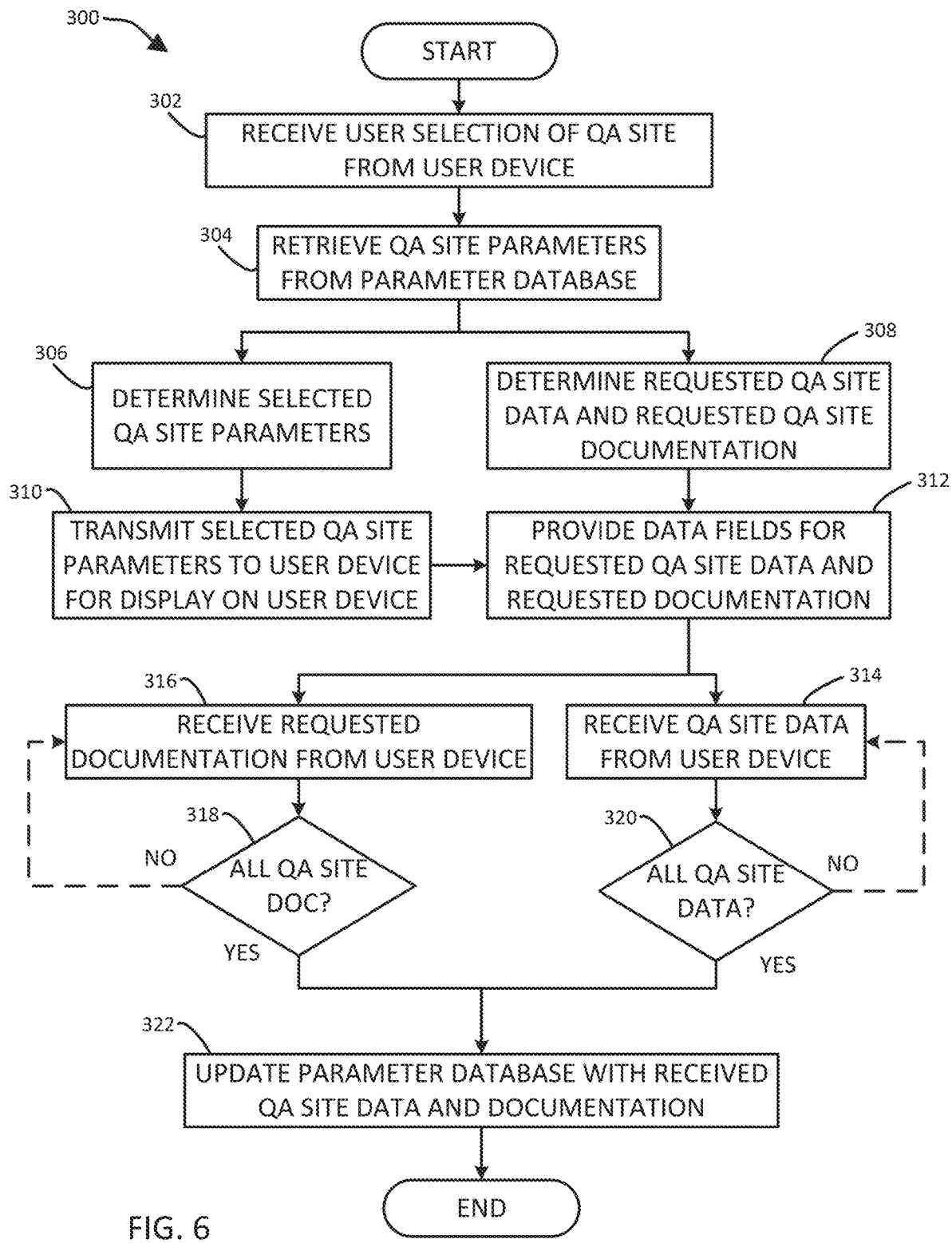
FIG. 6 is a flow chart of an embodiment of a process for using the quality assurance management system described herein.

FIG. 6 is a flow chart 300 of a method of an embodiment of using the QA system described herein. At 302, the QA server 85, or other server hosting the QA application, may receive a user selection of a QA site from a user device, such as the user device 55 associated with a QA technician. The technician may select a particular QA site using a graphical user interface (GUI) of the QA application 102, and may select from a plurality of QA sites, search for a particular QA site, etc. In response to the selection of a particular QA site via the QA application GUI, the QA server may retrieve a plurality of QA site parameters associated with the selected QA site from a site database, such as site database 120. In some embodiments, at 306, the QA server may determine one or more selected QA site parameters from the plurality of QA site parameters. In some embodiments, the selected service parameters may be determined based on the type of QA site, the type of equipment at the QA site, the type of QA activity scheduled for the site, parameters selected by the user technician or the supervisor, etc. At 310, the QA server may transmit the selected QA site parameters to the user device for display on the user device using the QA application GUI. In some embodiments, the selected QA site parameters may not be immediately displayed, but may be made available for accessing by the technician via the user device. At 308, the QA server may determine requested QA site data and/or requested QA site documentation to be collected or reported by the technician during the QA site visit. The determination of requested QA site parameters may be based on a variety of factors, such as the particular site equipment, the reason for the QA site visit (e.g., recent upgrades or other site modification), specific parameters selected by a manager or supervisor, the time since the last QA activity for that site, etc. For example, in some embodiments, after a cellular site may be upgraded or modified, a technician may be requested by the QA application to check certain RF parameters, such as antenna azimuth, antenna tilt, PCI, etc. In some embodiments, certain documentation may be requested related to the QA activity, such as photographs of the QA site or other documents. At 312, in some embodiments, the QA application may provide data fields on the QA application GUI accessible on the user device for the requested QA site data and indicate via the GUI the requested QA documentation. With this information, the technician may reference the QA application GUI via the technician's user device and know the particular QA parameters and documentation needed to complete the particular QA site visit.

At 314, the QA server may receive, via the QA application GUI on the user device, QA site data from the user device related to the requested QA site data. The received QA site data may be received via the data fields provided on the QA application GUI. For example, in some embodiments, the technician conducting the QA site visit may observe or measure a QA site parameter at the QA site, then enter or otherwise record the data value in the provided data filed in the QA application GUI. At 320, the QA server may determine whether all of the requested QA site data has been received from the user device. If so, the QA server may, at 322, update the parameter database to reflect the received QA site data. If the QA site data is incomplete, the QA server may provide a notification to the user device via the QA application GUI that the QA site data is incomplete. In some embodiments, the QA application may not allow the technician to submit a report of the QA site data if all of the requested QA site data are not received. Similarly, at 316, the QA server may receive, via the QA application GUI on the user device, QA site documentation related to the requested QA site documentation. The received documentation may be captured using the user device (e.g., a photograph of the QA site) and uploaded to the QA server via the QA application. At 318, in some embodiments, the QA server may determine whether all of the requested QA site documentation has been received from the user device. If so, the QA server may, at 322, update the parameter database to reflect the received QA site documentation. If the QA site data is incomplete, the QA server may provide a notification to the user device via the QA application GUI that the QA site documentation is incomplete. In some embodiments, the QA application may not allow the technician to submit a report of the QA site data if all of the requested QA site documentation is not received. In some embodiments, the QA server may transmit a notification to a manager or supervisor user device indicating that the QA site visit is complete or incomplete based on the received QA site data and documentation.

Figure 7:
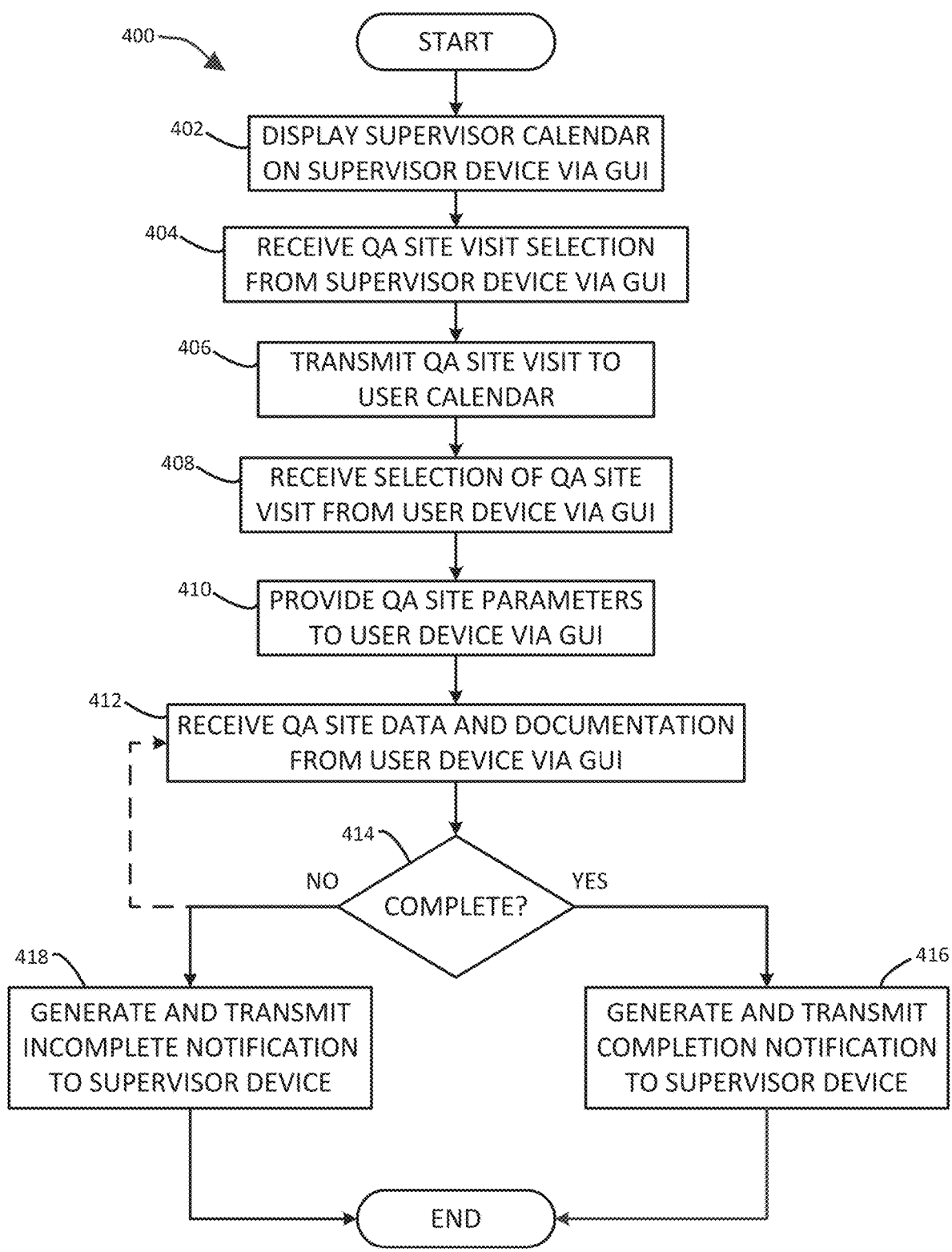
FIG. 7 is a flow chart of another embodiment of a process for using the quality assurance management system described herein.

FIG. 7 is a flowchart of another embodiment of a method 400 of using the QA system as described herein. In some embodiments, the method may be performed by a QA server, such as the QA server 85 in FIG. 4, but it is contemplated that other entities or computers/servers controlled by different entities may perform the method 400 as well or in the alternative. At 402, the method may include displaying a supervisor calendar on a supervisor device, such as supervisor device 65, via a QA application GUI, for example. In some embodiments, the calendar may be included in a scheduling module, such as scheduling module 110 shown and described in reference to FIG. 4. In some embodiments, the particular calendar displayed on the supervisor device may be dependent upon the particular user accessing the calendar. For example, each user may have permissions to access different events pertaining to QA activities. One manager may have access to QA site activities in one region not another region. Some users may only be granted access to QA site activities for which that user is responsible. In some embodiments, the QA application may determine which calendar events to display based upon the login credentials of the user. In some embodiments, the calendar displayed may provide options for the manager or supervisor to add or remove QA site visit events, specify details about those events, assign technicians to particular QA site events, etc. At 404, the method may include receiving one or more QA site visit selections from the supervisor device via the QA application GUI. The QA site visit selections may be entered into the supervisor calendar by the responsible manager or supervisor using the scheduling module, in some embodiments. In some embodiments, the QA site visit selection may include a particular QA site, such as a cellular site or other installation, the date or range of dates during which the QA site visit should take place, and/or the technician or technicians assigned to perform the QA site visit.

Based on the received QA site visit selection, the method may include, at 406, transmitting or otherwise adding the QA site visit selection to a user calendar associated, for example, with a user technician responsible for performing the QA site visit. In some embodiments, the particular technician assigned may have been previously associated with the particular QA site selected, or may have been selected specifically by the supervisor, or may be randomly assigned by the QA application or otherwise selected based on work load, expertise, previous experience, or other relevant criteria. In some embodiments, the user device, such as user device 55, may receive a notification indication that a QA site visit has been added to the user calendar. The notification may occur in the form of an email, text message, or other suitable messaging service. The designated technician may then see the QA site visit on its calendar when logging on to the QA application GUI. In some embodiments, the QA site visit may include additional details related to the assigned QA site visit, such as special notes or instructions from the supervisor, timing instructions, reporting instructions, etc. At 408, the method may include receiving a selection of the QA site visit from the use device via the QA application GUI. In some embodiments, the technician may select the QA site visit by accessing the QA QA application GUI and selecting the QA site visit event in the scheduling module. In some embodiments, a technician may only have access to seeing that particular technician's assigned site visits, and not site visits assigned to other technicians. In some embodiments, however, the technician may be able to see any other scheduled site visits, such as by team members, other technicians in the region, or by all technicians. In some embodiments, the QA site visit event may be displayed on the calendar as a selectable hyperlink that a user may select to access additional details related to the QA site, the QA site visit details, etc.

Based on the received selection of the QA site visit event from the user deice, at 410, the method may include providing QA site parameters to the user device associated with the assigned technician via the QA application GUI. In some embodiments, the method may include accessing a site parameter database, such as site database 120 in FIG. 4, to retrieve the particular QA site parameters. In some embodiments, providing the QA site parameters may include providing only a relevant selection of QA site parameters for that particular QA site, for the particular activity to be performed in that QA site event, or for the particular technician assigned. For example, if a particular QA site only has particular types of equipment, the QA site parameters provided may only include information pertaining to that particular equipment. As described in reference to FIG. 6, the QA application may also request particular reporting data and/or documentation to be collected by the technician in order to complete the particular QA site activity.

At 412, the method may include receiving QA site data and QA site documentation from the user device, such as via the QA application GUI. In some embodiments, the technician performing the QA site visit may make observations of the QA site and enter data values as requested by the QA application. The technician may also include additional QA site documentation, such as by taking and uploading photographs of the QA site. In some embodiments, the QA site data collected by the technician and entered into the QA application GUI may include RF parameters such as antenna azimuth, antenna tilt, PCI, etc. At 414, the method may include determining whether the QA site data and/or QA site documentation is complete. For example, the QA application may determine whether all of the requested QA site data or QA site documentation related to the QA site visit has been collected and received from the technician via the QA application GUI. If not, then the method may include, at 418, generating and transmitting a notification to a designated supervisor device indicating that the QA site visit was not completed. In some embodiments, such a notification may be sent after a pre-determined time period after the scheduled QA site visit, such as the following day, close of business on the scheduled day, etc. In such embodiments, the responsible supervisor or manager may be informed in a timely manner whether a QA site visit has been completed, and follow up accordingly. In some embodiments, the QA application my prevent a technician from submitting a QA site visit report if all or a required subset of the requested QA site data or QA site documentation is not received. If the QA application determines that all of the requested QA site data and/or documentation has been received, at 416, the QA application may generate and transmit a completion notification to a designated one or more users, such as to a supervisor device associated with a manager or supervisor.

Figure 8A:
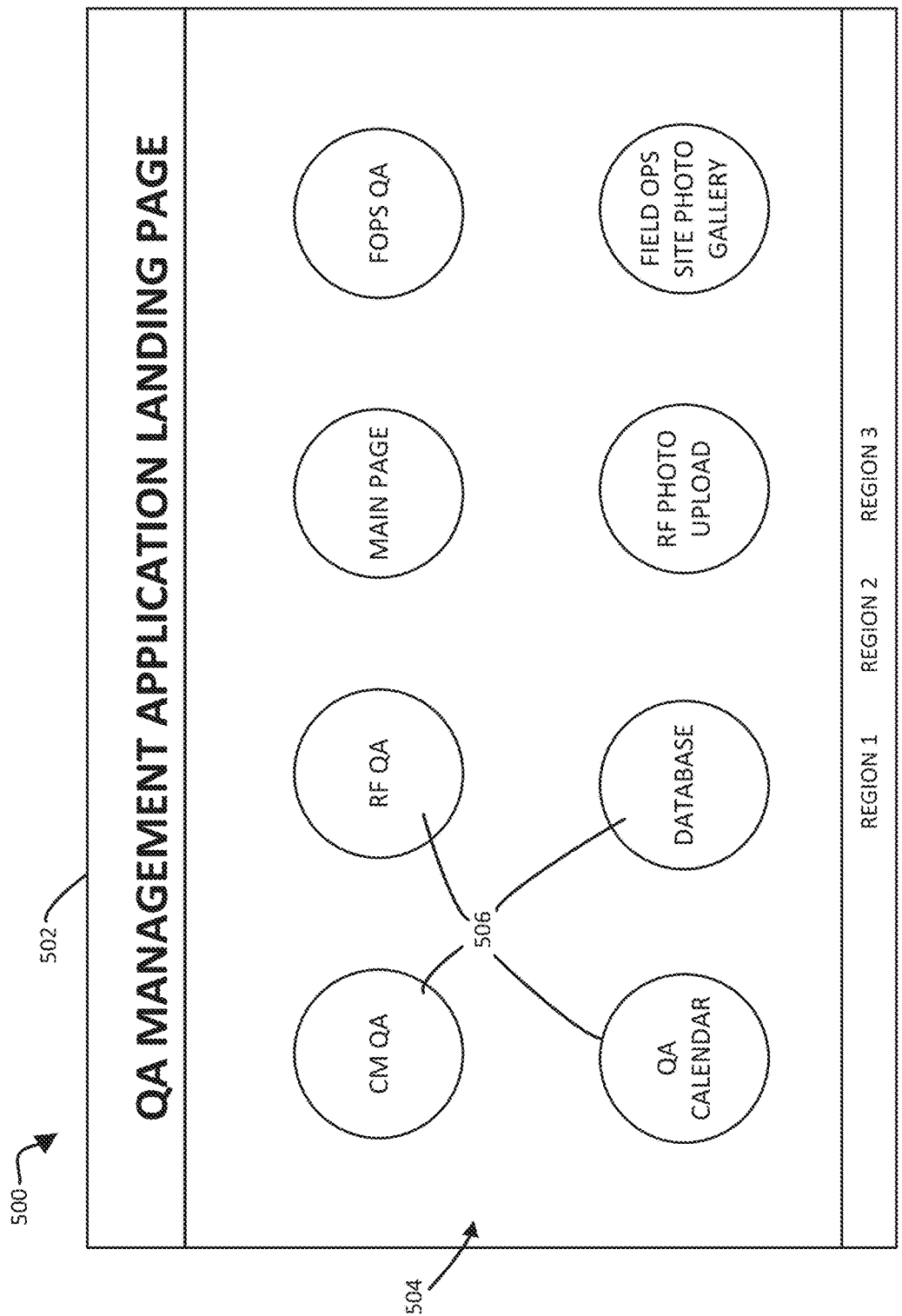
FIG. 8A is a screen shot of an embodiment of a graphical user interface for an embodiment of the quality assurance management system described herein.

FIG. 8A-8B8G illustrate embodiments of a graphical user interface (GUI) 500 of some embodiments of the QA application. The GUI 500 may provide an interface for a user to access one or more features of the QA application, such as inputting site data, uploading photographs or other documentation, or other features as described herein. FIG. 8A illustrates an embodiment of a landing page 502 for the GUI 500. The landing page 502 may include a launch page 504 with one or more links 506 to pages or other features of the QA application. The one or more links 506 may allow a user to access the various features of the QA application. For example, in some embodiments, the launch page may include links to a QA calendar, radio frequency (RF) QA, main page field operations (FOPS) QA, RF upload page, field ops site photo gallery, etc. In some embodiments, the photo upload pages and photo galleries may allow for a tech, engineer, field operative, or other personnel to take and upload photos of QA sites for documentation and other purposes as described herein. The database link may allow for a user to access the database that holds information and data for the QA sites managed using the QA management application. The QA calendar may be accessed to schedule, review, and monitor QA site visits by engineers, managers, or other maintenance personnel.

FIG. 8B is an embodiment of a QA calendar page 508 in the GUI 500. In some embodiments, the QA calendar page 508 may include a home button 510 that may return the user to the landing page 502. The QA calendar page 508 may include a display of the days in a week, month, year, etc. In some embodiments, the QA calendar page 508 may include a QA site scheduler 512 that may show each day of a chosen month and one or more site visits scheduled for each day. For example, in FIG. 8B, the date of July 1 shows QA site visits scheduled for Site 1 and Site 2, July 2 shows QA site visits scheduled for Site 3 and Site 4, etc. In some embodiments, the QA site scheduler 512 may provide for a user to select a date via the GUI 500 and the details of the site visits scheduled for the selected date may be displayed in a QA schedule portion 514 of the QA calendar page 508. For example, as shown in FIG. 8B, when a user selects July 15, a selected date 516 may be highlighted, shown in bold, or otherwise accentuated, and details 518 for any QA site visits scheduled for that day may be displayed in the QA schedule portion 514. In some embodiments, the details 518 displayed for the site visit may include the date of the scheduled site visit, a site name, a geographic region where the site may be located, a vendor name of a vendor who may be responsible for site maintenance, etc., the engineer or tech assigned to the QA site visit, a general contractor responsible for the site, etc. It is contemplated that additional details may be also shown in the QA scheduler portion 514, or that the details shown may be customizable by the user, manager, engineer, company, etc.

As described above, depending on the user accessing the QA management application, the QA calendar page 508 may provide information viewable and accessible based on the particular user's permissions. For example, a manager or other supervisor accessing the QA calendar page 508 and QA scheduler 512 may have access to site visits scheduled for all the engineers operating within the supervisor's geographic region, technical area, or other limiting criteria, if any. The supervisor or scheduling personnel may also use an add site visit button 520 to schedule a new site visit for a chosen date, time, location, etc. In some embodiments, an engineer or tech accessing the QA calendar page 508 may only have access to site visits for which that particular engineer may be assigned.

Figure 8C:
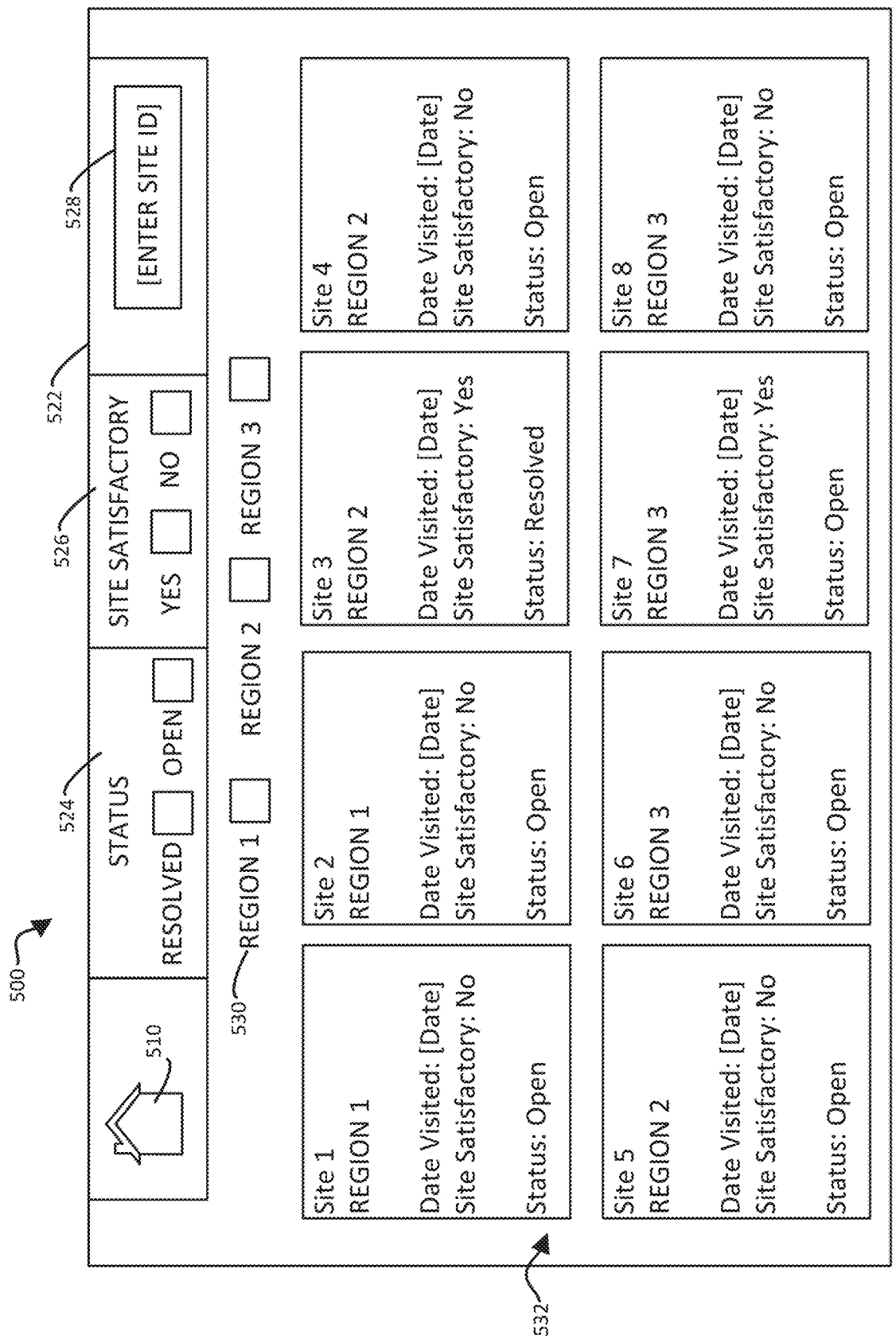
FIG. 8C is another screen shot of an embodiment of a graphical user interface for an embodiment of the quality assurance management system described herein.

FIG. 8C illustrates an embodiment of a field operations (FOPS) QA collection page 522 that may be accessed in some embodiments of the GUI 500. The FOPS QA collection page 522 may allow a user to filter information collected for various QA sites based on criteria such as status, whether the site is satisfactory or not, a site ID, a region, etc. The QA collection page 522 may include various options to filter QA sites that may be displayed in a QA site details portion 532 of the page. For example, the QA collection page 522 may include a status filter 524, a site satisfactory filter 526, a search box 528, and a region filter 530. The status filter 524 may provide users with options to filter QA sites by the QA site status based on whether issues associated with those sites may have been resolved or remain open. In such embodiments, a user may select to only be display sites for which issues have been resolved, sites for which issues may still remain open, or both. The site satisfactory filter 526 may allow for a user to filter QA sites by whether the site may be in a satisfactory condition or not based on various technical criteria for that QA site. In some embodiments, QA sites that are not in a satisfactory condition may still need additional attention from engineers, techs, vendors, etc. The search box 528 may provide for a user to enter a particular site ID or other search criteria by which to filter the displayed QA sites in the QA site details portion 532. The region filter 530 may allow a user to filter the displayed QA sites based on their geographic region. It is contemplated that other search and filtering criteria may also be used within the scope of the disclosure. FIG. 8D illustrates an embodiment of a RF engineering QA form 534 that may be accessed in some embodiments of the GUI 500. The RF engineering QA form 534 may provide for a user to submit a new issue relating to a QA site, for example, by inputting information and QA site details into a new issue form 536. The new issue form 536 may include one or more input fields for a user to enter or selected information specific to the QA site. For example, the new issue form may include input fields for the date a site was visited and/or the new issue may have been discovered or last witnessed, a cluster, a position, a vendor, an engineer assigned to the site or who may be submitting the new issue, the market for the particular QA site, the site ID, an issue category being reported concerning the QA site, the general contractor responsible for the QA site, a project that the QA site may be relate or belong to, a sector in which the QA site may be located, a particular issue relating to the QA site, a resolution status of issue, additional comments regarding the new issue, etc. In some embodiments, the fields may include drop-down menus that allow a user to select from a list of options, sliders for selecting among available numbers, fields for inputting numbers or words, or other input options. Once the relevant information for a new issue has been selected, the user may select a save icon 538 to register the new QA issue into the QA management application. In some embodiments, the new QA issue may now be available for search and filtering as related to the particular QA site.

Figure 8E:
FIG. 8E is another screen shot of an embodiment of a graphical user interface for an embodiment of the quality assurance management system described herein.

FIG. 8E illustrates an embodiment of a submit new QA page 540 that may be accessed in some embodiments of the GUI 500. The submit new QA page 540 may provide for a user to submit a new QA site into the QA application and associated database. Once the new QA site may be submitted, the details and other information related to the QA site and maintenance status may be accessible via the QA management application described herein. The submit new QA page 540 may include one or more QA site detail links 542 that may be selected to display subpages within the submit new QA page 540 with options for inputs or accessing information about the particular QA site. For example, the submit new QA page 540 may include subpages such as site information, cabinet power, baseband router, miscellaneous, overall site status, etc., but may include other subpages in other embodiments. FIG. 8E shows an embodiment of the site information subpage 544 that may include various fields for entering or selecting information related to the QA site. For example, the site information subpage 544 may include fields for date visited, side ID, market, tech or engineer, field operations team, manager, project, vendor, general contractor, etc. In some embodiments, once the new QA has been submitted by selecting the save icon 538, the newly submitted QA site may be available for authorized users to access via the QA application. In some embodiments, the GUI 500 may provide a similar page for displaying the QA site information for each QA site and similar fields may be used to change or update data for that QA site.

Figure 8F:
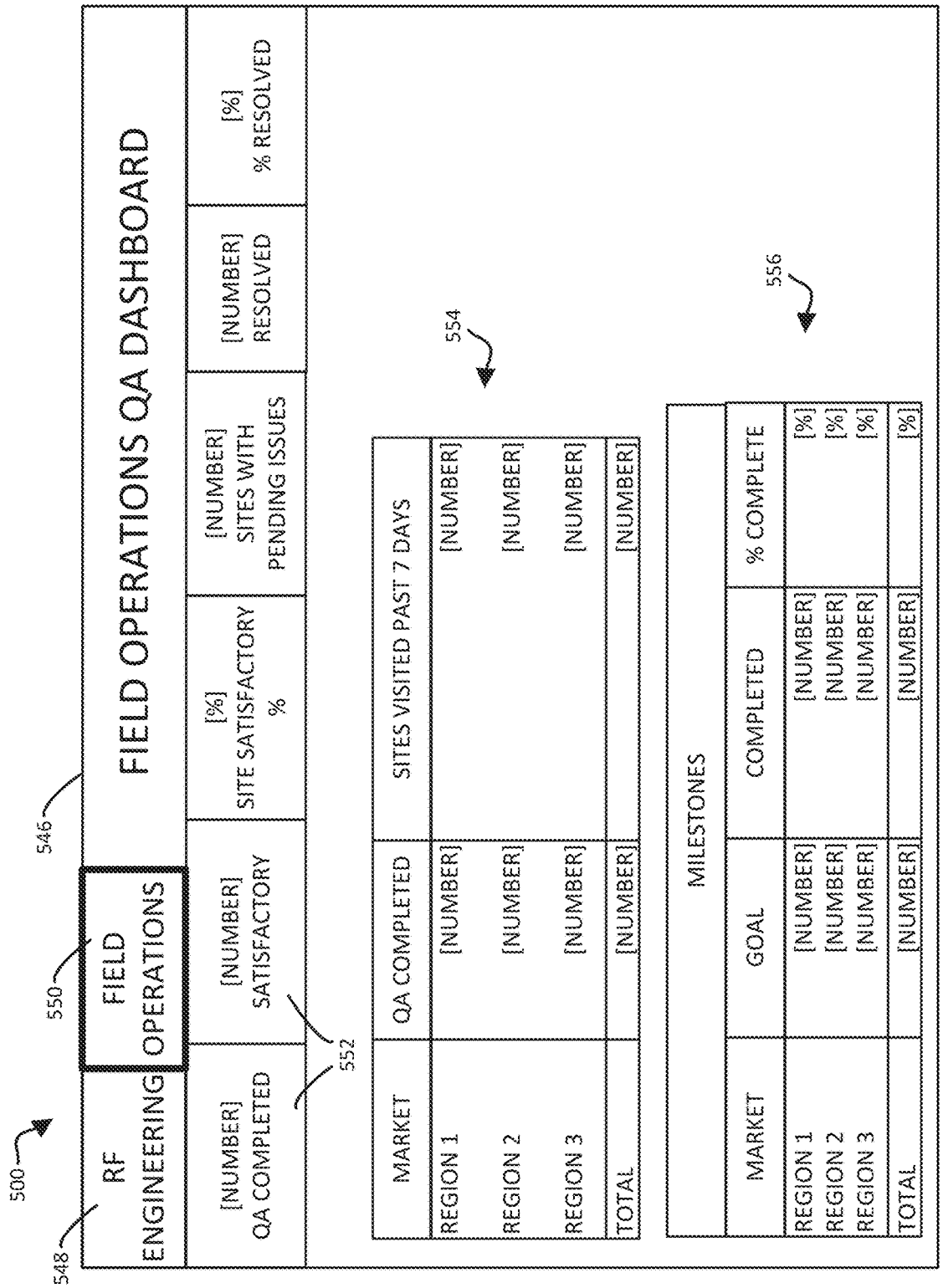
FIG. 8F is another screen shot of an embodiment of a graphical user interface for an embodiment of the quality assurance management system described herein.

FIG. 8F illustrates an embodiment of a field operations (FOPS) QA dashboard 546 that may be accessed in some embodiments of the GUI 500. The FOPS QA dashboard 546 may provide for a user to access data and statistics for field operations. In some embodiments, a similar RF engineering dashboard may be accessed via the GUI by selecting an RF engineering link 548 and the FOPS QA dashboard 546 by selecting a field operations link 550. The FOPS QA dashboard 546 may include one or more fields displaying QA statistics regarding field operations for some or all QA sites, or a custom set of QA sites chosen by the user. For example, FIG. 8F includes field for displaying a number of QA operations completed, a number of those QA operations that were satisfactory, a percentage of sites for which operations have been completed satisfactorily, a number of sites with pending issues, a number of sites with issues that have been resolved or recently resolved, and a percentage of sites with issues that have been resolved. Other fields with additional data may be available in other embodiments. The FOPS QA dashboard 546 may also include regional statistics window 554 that may include data and/or statistics for QA sites broken down by geographic region. For example, the regional statistics window 554 may include data regarding the number of QA visits or operations completed per region, and the number of QA sites visited within a predetermined set of time, such as seven days. Other data or other time periods may be included in the regional statistics window 554 in other embodiments. The FOPS QA dashboard 546 may also include a regional milestones window 556 in some embodiments. The regional milestones window 556 may include data related to milestones or goals for QA site visits that may be set by management, teams, companies, or other metrics. For example, the embodiment of the regional milestones window 556 in FIG. 8F includes, broken down by region, a goal number of QA site visits, a number of QA sites completed, and a percentage of the goal QA site visits completed. Other embodiments of the regional milestones window 556 may include other goals or data.

FIG. 8G illustrates an embodiment of a database info page 558 that may be accessed in some embodiments of the GUI 500. The database info page 558 may provide for a user, such as an engineer, tech, or other personnel, to enter or access information particular to one or more QA sites. For example, the database info page 558 may include fields 560 for site ID, field operations team, cell name, PCI, azimuth, antenna type, mechanical tilt, other site access details, etc. Other embodiments of the database info page 558 may include other information related to the QA sites.

Those skilled in the art will recognize that the GUI pages and features shown and described with respect to FIGS. 8A-8G are merely exemplary and that the GUI 500 may not be limited to those exemplary embodiments. In some embodiments, the GUI 500 may include additional features and pages, including but not limited to vendor scorecards for tracking vendor performance with respect to QA site maintenance and other targets, site list pages listing QA sites that may be filtered or searched based on various criteria, field operations QA information pages listing information on QA sites particular to each respective site, photo galleries for QA sites, upload pages for QA sites, etc.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the system and the methods described herein may be configured to efficiently provide for efficient, easily transportable and remotely accessible coordination and completion of quality assurance activities. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method for quality assurance management of cellular sites, the method comprising:
    receiving, via a graphical user interface (GUI), a user selection of a selected cellular site of a plurality of cellular sites;
    based on the user selection of the selected cellular site, retrieving, from a site database, one or more site parameters associated with the selected cellular site;
    selectively displaying, on a user computing device, the one or more site parameters for the selected cellular site via the GUI;
    receiving, via the GUI, one or more photographs of the selected cellular site, the one or more photographs being captured by the user computing device;
    transmitting the one or more photographs to the site database;
    providing, via the GUI, one or more site data fields for receiving cellular site data;
    receiving, via the one or more site data fields, one or more user entries of cellular site data associated with the selected cellular site; and
    transmitting the one or more user entries of cellular site data to the site database.

2. The method of claim 1 further comprising displaying, via the GUI, an address of the selected cellular site.

3. The method of claim 2, wherein the address of the selected cellular site is displayed in the GUI as a selectable hyperlink, and wherein the method further comprises providing navigation instructions via the user computing device upon selection of the selectable hyperlink.

4. The method of claim 1 further comprising generating a cellular site report based on the one or more user entries of cellular site data.

5. The method of claim 1, wherein the one or more site parameters include one or more of antenna azimuth, physical channel identity, antenna layout, and antenna tilt.

6. The method of claim 1 further comprising displaying, upon selection by the user, a site visit calendar via the GUI, the site visit calendar indicating one or more dates for cellular site visits associated with one or more of the plurality of cellular sites.

7. The method of claim 1 further comprising receiving a cellular site scheduling selection from a supervisor computing device, the cellular site scheduling selection identifying a cellular site visit date for visiting the selected cellular site.

8. The method of claim 7 further comprising displaying the cellular site scheduling selection on the user computing device in response to receiving the cellular site scheduling selection from the supervisor computing device.

9. The method of claim 1 further comprising determining whether the received one or more user entries of cellular site data includes a predetermined set of requested cellular site data associated with the selected cellular site.

10. The method of claim 9 further comprising transmitting a completion notification to a supervisor device when the received one or more user entries of cellular site data includes the predetermined set of requested cellular site data associated with the selected cellular site.

11. A system for quality assurance management of cellular sites, the system comprising:

a user computing device connected to a digital communications network, the user computing device including one or more processors programmed to operate a graphical user interface (GUI) of a quality assurance (QA) application and a camera;

a site database accessible via the digital communications network, the site database configured to store cellular site data for a plurality of cellular sites; and a quality assurance (QA) server connected to the digital communications network, the QA server including one or more processors programmed to:

receive, from the user computing device, a user selection of a selected cellular site of the plurality of cellular sites, the user selection being made via the GUI, determine one or more selected site parameters of a plurality of site parameters associated with the selected cellular site, transmit the one or more selected site parameters to the user computing device via the GUI, receive one or more photographs of the selected cellular site from the user computing device, the photographs having been captured with the camera on the user computing device, receive one or more user entries of cellular site data from the user computing device, the one or more user entries of cellular site data being associated with the selected cellular site, determine whether the one or more user entries of cellular site data include a predetermined set of requested cellular site data associated with the selected cellular site, and transmit the one or more photographs and the one or more user entries of cellular site data to the site database when the QA server determines that the one or more user entries of cellular site data includes the predetermined set of requested cellular site data associated with the selected cellular site.

12. The system of claim 11 further comprising a supervisor computing device connected to the digital communications network, wherein the one or more processors of the quality assurance server are further programmed to receive a cellular site scheduling selection from the supervisor computing device via the GUI of the QA application, the cellular site scheduling selection identifying a cellular site visit date for visiting the selected cellular site.

13. The system of claim 12 wherein the one or more processors of the quality assurance server are further programmed to transmit the cellular site scheduling selection in response to receiving the cellular site scheduling selection from the supervisor computing device so as to display the cellular site scheduling selection on the user computing device via the GUI of the QA application.

14. The system of claim 11 further comprising a supervisor computing device connected to the digital communications network, wherein the one or more processors of the quality assurance server are further programmed to transmit a completion notification to the supervisor computing device when the received one or more user entries of cellular site data includes the predetermined set of requested cellular site data associated with the selected cellular site.

15. The system of claim 11 further comprising a supervisor computing device connected to the digital communications network, wherein the one or more processors of the quality assurance server are further programmed to transmit an incomplete notification to the supervisor computing device when the received one or more user entries of cellular site data does not include the predetermined set of requested cellular site data associated with the selected cellular site.

16. A system for quality assurance management, the system comprising:

means for receiving a user selection of a selected cellular site of a plurality of cellular sites;

means for retrieving, from a site database, one or more site parameters associated with the selected cellular site based on the user selection of the selected cellular site;

means for determining one or more selected site parameters of a plurality of site parameters associated with the selected cellular site;

means for transmitting the one or more selected site parameters to a user computing device;

means for displaying the one or more selected site parameters for the selected cellular site on the user computing device;

means for receiving one or more photographs of the selected cellular site, the one or more photographs being captured by the user computing device;

means for receiving one or more user entries of cellular site data from the user computing device, the one or more user entries of cellular site data being associated with the selected cellular site;

means for determining whether the one or more user entries of cellular site data include a predetermined set of requested cellular site data associated with the selected cellular site; and means for transmitting the one or more photographs and the one or more user entries of cellular site data to the site database when the one or more user entries of cellular site data includes the predetermined set of requested cellular site data associated with the selected cellular site.

17. The system of claim 16 further comprising means for to receiving a cellular site scheduling selection from a supervisor computing device, the cellular site scheduling selection identifying a cellular site visit date for visiting the selected cellular site.

18. The system of claim 17 further comprising means for transmitting the cellular site scheduling selection in response to receiving the cellular site scheduling selection from the supervisor computing device so as to display the cellular site scheduling selection on the user computing device.

19. The system of claim 16 further comprising means for transmitting a completion notification to a supervisor computing device when the received one or more user entries of cellular site data includes the predetermined set of requested cellular site data associated with the selected cellular site.

20. The system of claim 16 further comprising means for transmitting an incomplete notification to a supervisor computing device when the received one or more user entries of cellular site data does not include the predetermined set of requested cellular site data associated with the selected cellular site.

* * * * *